United States Patent [19]
Stephens

[11] Patent Number: 5,218,616
[45] Date of Patent: Jun. 8, 1993

[54] TELEPHONE LINE TESTER
[75] Inventor: Charles D. Stephens, Dallas, Tex.
[73] Assignee: Communications Technology Corporation, Dallas, Tex.
[21] Appl. No.: 771,322
[22] Filed: Oct. 2, 1991
[51] Int. Cl.[5] .............................................. H04M 1/24
[52] U.S. Cl. ........................................ 379/27; 379/21; 379/29; 379/413
[58] Field of Search ..................... 379/21, 22, 24, 27, 379/29, 30, 413

[56] References Cited

U.S. PATENT DOCUMENTS

| | | |
|---|---|---|
| 3,508,139 | 4/1970 | Rummel . |
| 3,711,661 | 1/1973 | Garrett et al. . |
| 4,051,333 | 9/1977 | Schomburg . |
| 4,055,733 | 10/1977 | Holsinger et al. . |
| 4,544,807 | 10/1985 | Sers . |
| 4,552,996 | 11/1985 | de Bergh . |
| 4,564,728 | 1/1986 | Romano . |
| 4,600,810 | 7/1986 | Feldman et al. . |
| 4,720,845 | 1/1988 | Lechner et al. . |
| 4,751,724 | 6/1988 | Amadio et al. .................. 379/24 |
| 4,825,458 | 4/1989 | Dash .................................. 379/1 |
| 4,827,498 | 5/1989 | Ross . |
| 4,841,559 | 6/1989 | Curtis ............................... 379/27 |
| 4,912,755 | 3/1990 | Blood et al. ....................... 379/6 |
| 4,969,179 | 11/1990 | Kanare et al. . |
| 5,025,466 | 6/1991 | Hilligoss et al. ................. 379/21 |

Primary Examiner—Stafford Schreyer
Attorney, Agent, or Firm—Crutsinger & Booth

[57] ABSTRACT

Disclosed is a telephone line testing device comprising: clip leads for connecting the device to "ring," "tip" and external ground lines of the telephone line to be tested. Terminal pads make "ring" and "tip" connections to a craft telephone and a first testing circuit connectable to receive DC signals from the "ring" and the "tip" lines to provide electrical signals indicative of the magnitude of direct current available from the lines. Another testing circuit is connectable to receive AC signals from the "ring" and the "tip" lines to provide electrical signals indicative of the signal loss of the lines. A third testing circuit is connectable to receive AC signals selectably either from the "tip" and the "ring" connections or from the "tip" and the external ground connections comprising a filter and amplifier to receive and treat the AC signals and to apply the treated signals to the input of the second testing circuit. A line holding and power supply circuit is connectable to draw a line holding current from the "ring" and said "tip" lines through the clip leads and to produce regulated direct current to power the second and third testing circuits.

20 Claims, 4 Drawing Sheets

TELEPHONE LINE TESTER

TECHNICAL FIELD

Pass-fail test device for qualifying a subscriber loop telephone circuit to defined minimum service requirements for loop current, loss, circuit noise, and power influence.

BACKGROUND OF INVENTION

This invention relates to a telephone line test device and more particularly to a small self-contained line-powered telephone line test device to indicated qualification of a subscriber loop telephone circuit to minimum requirements for loop current, signal loss, circuit noise and power influence noise.

As a result of recent reorganization of U.S. domestic and international telephone companies and systems pursuant to court orders, telephone customers are allowed much greater latitude in the types of equipment they are allowed to attach or plug into the commercial telephone network. The changes have brought about a division of responsibility for maintenance of the telephone system between the subscriber, responsible for equipment and lines within the network embodied in his private structures and premises and the telephone companies supplying to their subscribers the service lines to the central office switching, interconnect and network services and responsible for the maintenance and repair of service lines and equipment used by them to provide subscribers with the interconnect switching and network services.

Thus, it has become desirable to isolate and separately test the telephone equipment lines of the telephone company network and lines and equipment of the customer's "internal" network. Testing equipment of the general type herein disclosed for the testing of telephone lines and equipment is typified by the disclosures of the following U.S. patents.

U.S. Pat. No. 4,912,755 to Blood, et al. shows a hand-held multiple test device for conducting line tests at subscriber premises. The device is powered from self-contained batteries, not from the phone lines. It uses multiple individual and lockable exclusive push button switches for selecting functions to check current in the central office line with a 600 ohm and a 900 ohm termination (LCD indicator), to check ground start and to check line current with customer equipment "off hook." Also available are tone generation functions for line identification and fault location. No specific noise test is indicated.

U.S. Pat. No. 4,051,333 to Schomburg provides a line voltage tester installed as part of a telephone lineman's handset. Test results are indicated by a first tone, a second tone, both tones or no tone in the ear phone. The device is powered by line energy in capacitor storage.

U.S. Pat. No. 4,055,733 to Holsinger, et al. shows a test device to be switched between multiple lines to compare the signal power on each line with a reference. The comparator and other operating circuits are not line powered. LED's indicate whether line power is over or under reference in stepped magnitudes. Blanking circuits allow only one diode to light at any one time.

Feldman, et al. U.S. Pat. No. 4,600,810 discloses a go-no go tester with a lit LED indicating nominal 8 volt tip-to-ring voltage on a phone line terminated with 400 ohms. The internal amplifier is "powered" from the line under test but without isolation.

U.S. Pat. No. 4,841,559 to Curtis uses a 2-pole, 5-position switch to provide various line checks on both company service lines and the customer's network. LED's indicate go-no go test results; the amplifiers used on some tests are powered from the service line but without isolation or regulation.

Dash U.S. Pat. No. 4,825,458 shows equipment for testing subscriber equipment to prevent damage to the service network.

Rummel U.S. Pat. No. 3,508,139 provides an electronic "line holding" circuit that draws a constant current to activate holding relays while presenting "infinite" impedance to AC test signals for line loss check. The circuit is not used as a power supply for other test circuits.

U.S. Pat. No. 4,522,996 to DeBergh provides a device for the measurement of noise on a telephone line that is "in use" by sampling the signal level over a number of periods. The device is externally powered.

Amadio, et al. U.S. Pat. No. 4,751,724 discloses a device for automatic measurement and comparison of resistances (a bridge circuit) to locate faults on a line. The device uses an external power source.

Garrett, et al. U.S. Pat. No. 3,711,661 shows a multi-function automatic test device for use at the central office. The device does not use line voltages for power.

U.S. Pat. No. 4,969,179 to Kanare, et al. discloses a battery-powered line monitoring device for subscribers to provide a light and/or sonic alarm in the event of low voltage on the line, an open or a short on the line.

U.S. Pat. No. 4,720,845 to Lechner, et al. shows a surge protection device for a subscriber line interconnect circuit. The device is not a test circuit in the usual sense.

U S. Pat. No. 4,544,807 to Sers discloses a fault detection and locating circuit that can be placed at the interface between customer-provided circuits and equipment and the telephone company's circuits and equipment. No noise testing is provided.

The device of U.S. Pat. No. 4,564,728 to Romano is a simple plug-in device to detect the presence of DC voltage on a telephone line.

Ross U.S. Pat. No. 4,827,498 shows a DC current detection device to be inserted at the customer/company line interface to indicate the location of a fault according to a current flow detector.

In contrast to the foregoing devices, the present invention provides a telephone line testing device capable of four different tests selectable through a slide switching means with test results indicated by a three-color light-emitting diode as "pass", "fail" or "marginal." The tester is small, hand held and light weight and requires no batteries or separate power supply in that it is powered from the telephone lines under test through a shunt-regulated supply circuit that does not adversely affect test results.

It is an object then of the present invention to provide a telephone line test device that is hand held, light weight and requires no batteries.

It is a further object of this invention to provide a telephone line testing device capable of selectively providing telephone line tests for central office supplied loop current, AC current loss, circuit noise and power influence over longitudinal noise.

It is a still further object of the present invention to provide a telephone line testing device that is powered by line current through a unique shunt-regulated supply circuit leaving unaffected the line parameters to be tested.

BRIEF DESCRIPTION OF THE DRAWINGS

These and other objects and advantages of the present invention will become apparent from reading the following detailed description in connection with the accompanying drawings wherein.

DETAILED DESCRIPTION OF A PREFERRED EMBODIMENT

Figure 1:
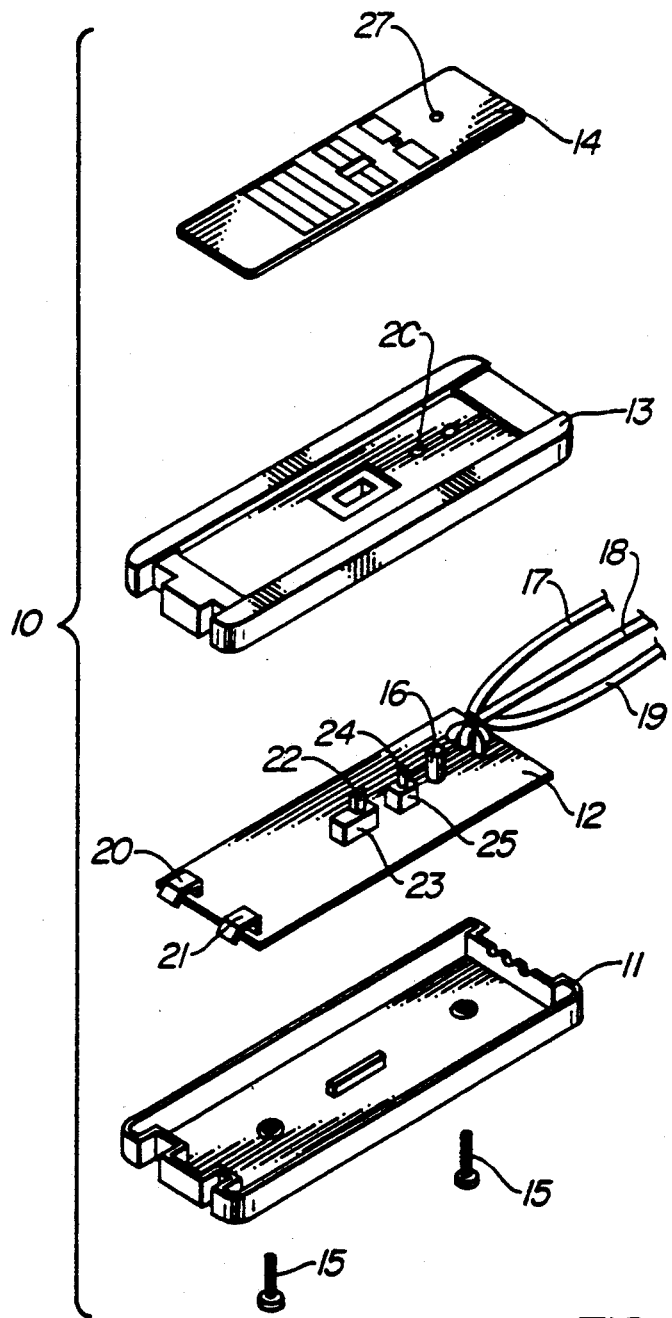
FIG. 1 is an exploded view in perspective of the tester of the present invention illustrating the case, circuit board and front panel.

Turning now to FIG. 1, there is shown an exploded perspective view of the telephone line tester of the present invention indicated generally as 10. The tester 10 comprises a back cover 11, circuit board 12, front cover 13 and front panel 14. The tester may be held together by screws 15 passing through the back cover 11, circuit board 12 and into threaded holes (not shown) in the front cover 13. External electrical connections to the tester are through the clip leads 17, 18 and 19 for the "ring", "tip" and "ground" connections, respectively. A pair of clip terminal pads 20 and 21 provide connections to attach "ring" and "tip" clips respectively of a craft telephone for dial communication to the central office. The control button 22 of a four-position test selector switch 23 extends through openings in the front cover 13 and the front panel 14. Also, the control button 24 of a two-position function switch 25 extends through the openings in the front cover and front panel. Switch 25 selects either the "dial" or "test" function, and switch 23 selects any one of four tests to be conducted.

Light from a light-emitting diode indicator 16 is visible through openings 26 and 27 in the front cover 13 and front panel 14 respectively.

Figure 2:
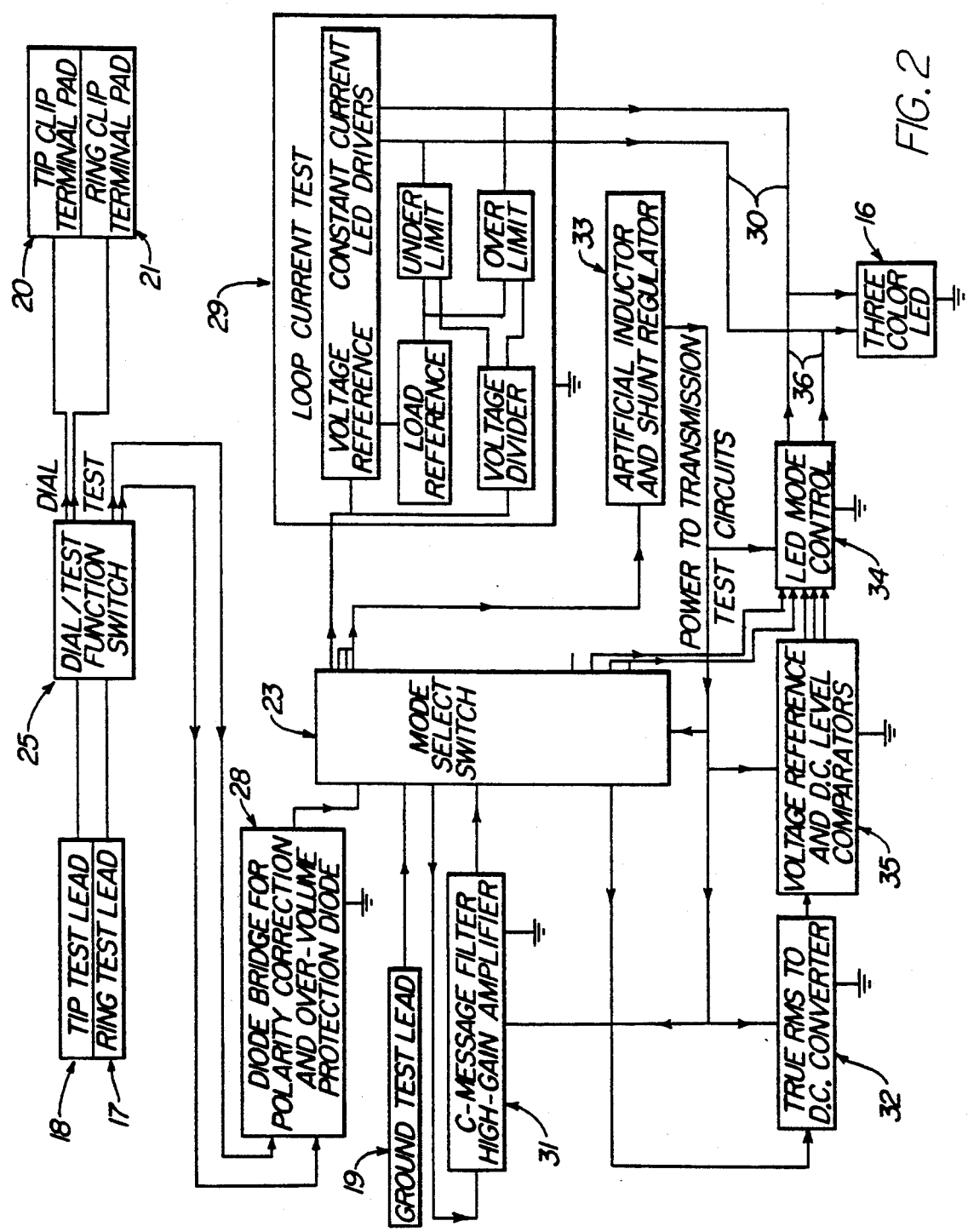
FIG. 2 is a block diagram illustrating the various functional parts of the electrical circuit of a tester of the present invention.

Turning now to FIG. 2, there is shown a block diagram of the circuits and the functions of the line tester of the present invention.

As illustrated in FIG. 2, connections are made from the tester to the line to be tested through test clip lead 17 (ring) 18 (tip) and 19 (ground). Test leads 17 and 18 may be selectably connected through function switch 25 to clip lead pads 20 and 21 in the "dial" position of the switch or through diode bridge 28 to the selector switch 23 and the test circuits of the tester in the "test" position. Function switch 25 is preferably a double-pole, double-throw slide action switch.

Test selection switch 25 which is preferably a four-pole, four-position slide action switch and has connected to its poles the regulated output from power supply 33, the "tip" test lead 18 (through diode bridge of block 28), the input to filter/amplifier 31 and the input a true RMS AC to DC converter 32.

In its first position, selector switch 23 connects clip leads 17 and 18 to the loop current test circuit 29 for evaluation of the DC loop current. Loop test results are applied to test indicator light 16 (shown as a three-color LED) on lines 30.

In its second position, switch 23 connects the "tip" clip lead 18 to inductor/regulator 33 and through a coupling capacitor to the input of the AC/DC convertor 32. In addition, the input of filter/amplifier 31 is grounded, and the output of inductor/regulator 33 is applied to the appropriate inputs of the LED mode control circuit 34.

In switch 23 position three, "tip" lead 18 is connected directly to inductor/regulator 33 and through a coupling capacitor to the input of filter/amplifier 31, and the output of inductor/regulator 33 is applied to other appropriate inputs of the LED mode control 34.

In position four of switch 23, ground test lead 19 is coupled through an attenuator to the input of filter/amplifier 31, "tip" lead 18 is connected to an input of inductor/regulator 33, the output of which is connected to appropriate inputs of LED mode control 34 as in position three.

As seen in FIG. 2, the regulated output of inductor/regulator 33 is connected directly to furnish operating power to filter/amplifier 31, AC/DC convertor 32, LED mode control 34 and the voltage reference and DC level comparator 35 which receives the output of AC/DC convertor 32. Output of the reference/comparator 35 is applied to LED mode control 34. The three-color LED 16 responds to output of the LED mode control 34 on lines 36 in all positions of switch 23 except the first.

Thus, it can be seen that the telephone line tester of the present invention has two distinct measurement systems that share only a three-color LED 16 for result display and an input circuit consisting of a diode bridge 28 for polarity correction and a zener diode for over current line condition protection as will be explained subsequently in more detail. Selection of the test circuit to be activated is by four-pole, four-position switch 25. The first test selected by this switch 25 is the qualifying of the loop current supplied by the telephone line. In this test, it is critical that the proper DC load be presented to the telephone line when loop current is near its pass/fail limit and that this load impedance not change when the indicator LED state changes.

Figure 3:
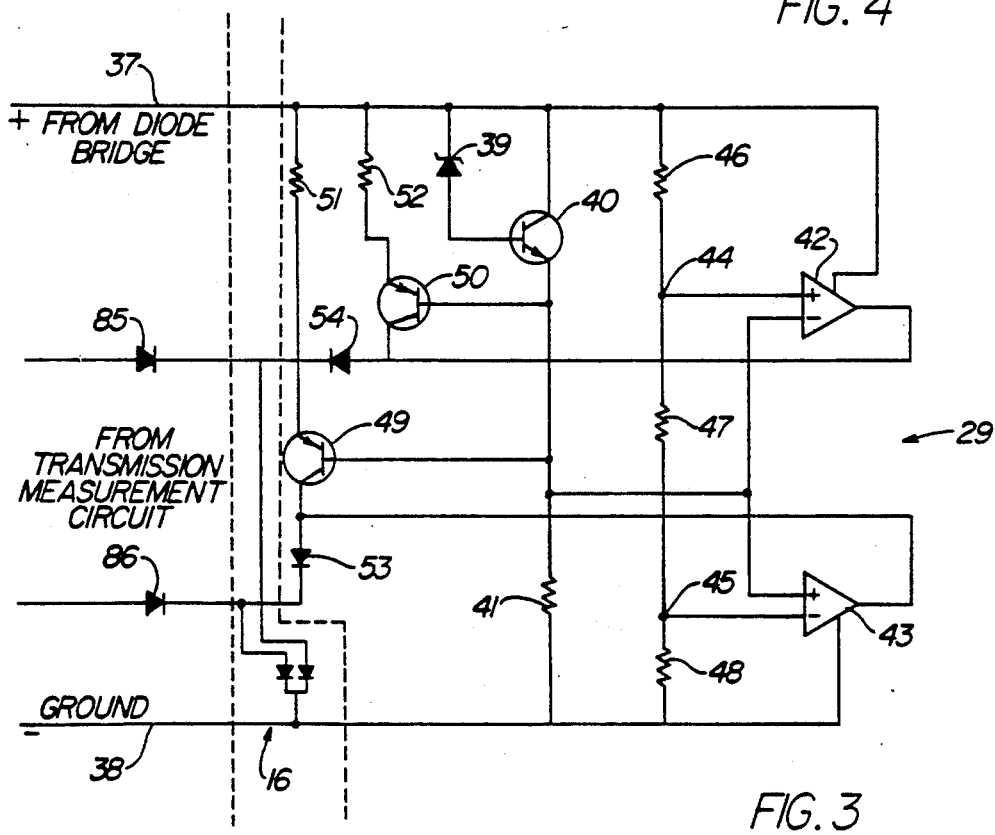
FIG. 3 is a schematic diagram illustrating in detail the circuit of the loop current measurement section of the tester of the present invention.
Figure 5:
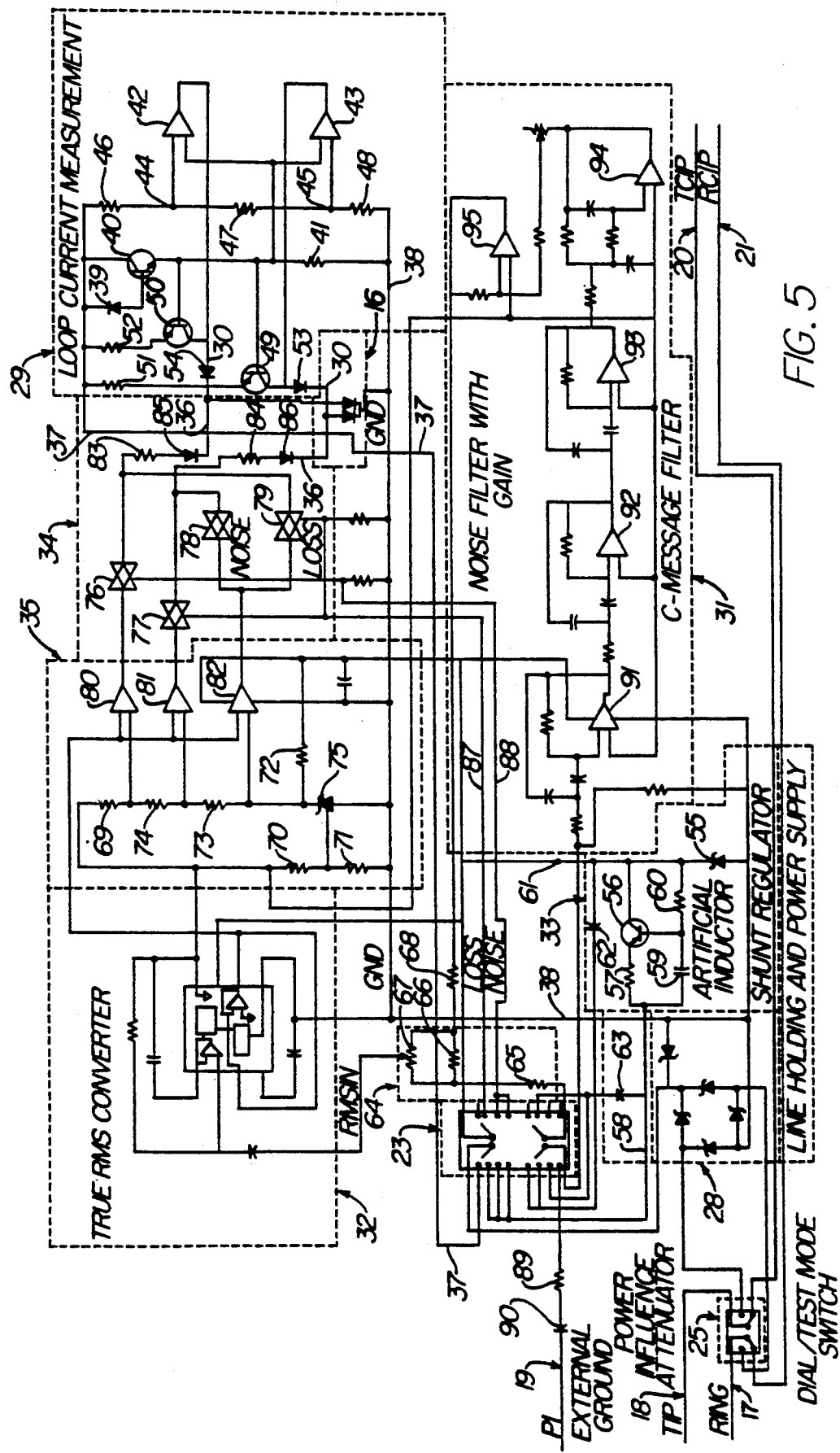
FIG. 5 is a schematic diagram illustrating in detail the entire circuit of the tester of the present invention.

Details of this loop current test circuit 29 are shown in FIGS. 3 and 5.

Through switch 25 "tip" lead 18 is connected to line 37, and "ring" lead 17 is connected to circuit ground line 38 of the loop current measurement circuit of FIG. 3. Zener diode 39, transistor 40 and resistor 41 provide a voltage reference input to voltage comparators 42 and 43. Other inputs to voltage comparators 42 and 43 are provided by taps 44 and 45 from the voltage divider comprising resistors 46, 47 and 48. Outputs from comparator/amplifiers 42 and 43 activate constant current LED drives comprising transistors 49 and 50, resistors 51 and 52 and diodes 53 and 54.

To present a stable load for all states of the LED 16, the drive power for the two diodes of the LED is derived from constant current sources. The diodes in the LED are then turned off selectively by dual voltage comparators 42 and 43 shorting each diode supply current. The current supplied to the LED 16 and that used to supply comparators 42 and 43 and resistors 41 and 46 through 48 presents an equivalent load of 430 ohms at 20 milliamps of loop current.

Test results to a usual minimum requirement of 20 milliamps for the line are indicated by the LED 16 showing green for "pass", yellow for "marginal" (20 to 23 milliamps) and red for "fail."

The voltage comparator elements 42 and 43 are of standard commercial type designated as LM393. Transistor 40 is a 2N3904, transistors 49 and 50 are designated MPS8599 and diodes 53 and 54 are 1N4148's. Appropriate resistor values are 41 equals 1.43k Ω, 46 equals 26.1k Ω 47 equals 14k Ω, 48 equals 61.9k Ω, 51 equals 237 Ω and 52 equals 464 Ω.

The three remaining tests are AC tests and all use a completely different scheme from the first test for power and line loading. Since these tests are for qualifying AC signals present on the telephone line and therefore must have controlled AC impedance termination. DC current must be drawn from the telephone line at the same time to provide the required "holding" function for the central office equipment to maintain the connection to the central office test circuits.

The telephone line tester of the present invention is unique in that it is completely powered from the same telephone line that it measures. This is accomplished through a unique artificial inductor and shunt-regulator circuit 33 shown in detail in FIG. 4 as well as in FIG. 5. This circuit allows the high-gain amplifier circuits of block 31 and the true RMS AC-to-DC convertor 32 circuit to be powered from the same source that is being measured. Most common power supply circuits are effectively common base-type amplifiers that amplify load-created noise back to the source. Since the present line tester measures noise on its power source, the common approach will not work.

Figure 4:
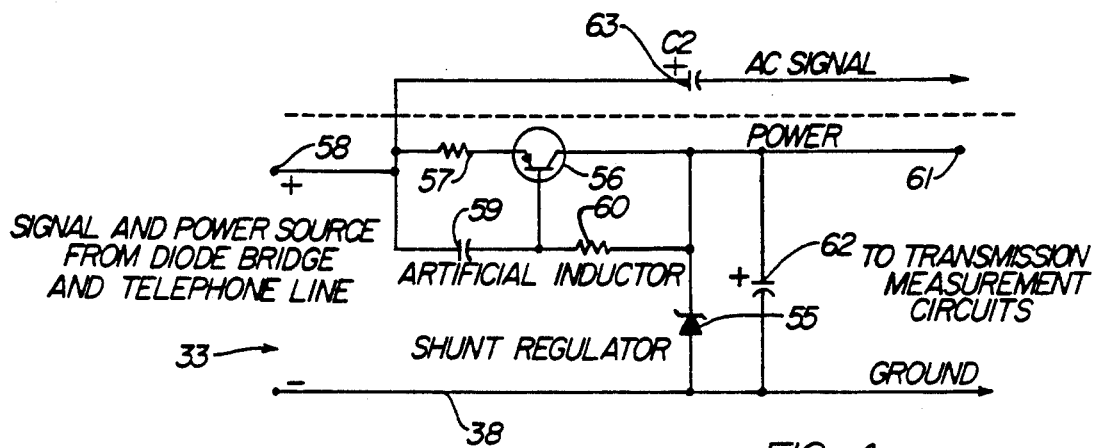
FIG. 4 is a schematic diagram illustrating in detail the holding and power supply circuit of the present invention.

The circuit of FIG. 4 uses a zener diode 55 to shunt regulate the power supply to 6.2 volts and assumes that the power source has a substantial DC impedance. In the case of a telephone line, this is a valid assumption. The very low AC impedance, presented by the zener diode to the telephone line, would interfere with the signals to be measured. Therefore, a self-biasing circuit using a single transistor 56 as an inductor in series with the telephone line is used to provide the required AC isolation with a minimal DC voltage drop. The circuit works by creating a constant DC voltage on the low value (7.5 ohms for example) emitter resistor 57 connected to the positive source lead terminal 58. The constant emitter resistor voltage is maintained by a relatively large capacitor (such as 220 microfarads) 59 between the base terminal of transistor 56 and the emitter resistor 57 at the positive source terminal 58. The current to charge the capacitor comes from a relatively high-value (6.2k Ω for example) resistor 60 to the collector that also connects to the load terminal 61. A stable self-biased operating current is then a result of nonlinear gain of the transistor 56 near its saturation point. The result is a constant collector current similar to that of an inductor. The effective inductance is directly proportional to the capacitor value.

A filter capacitor 62 of, for example, about 220 microfarads is connected between the collector of transistor 56 and circuit ground. Transistor 56 may be an MPS8599.

The combination of simulated inductance and shunt-voltage regulation reduces the effect of power supply noises created by the measurement circuits on the power source, in this case the telephone line itself.

As previously mentioned, a coupling capacitor 63 (for example 47 microfarads) couples AC on the line under test to the AC test circuits. These circuits are shown in the detailed schematic diagram of FIG. 5.

The first of the three AC test measurements is a signal loss test. In this test, capacitor 63 couples the AC signal on the telephone line through switch 23 to an attenuator 64 consisting of resistors 65 through 67. This attenuator supplies the required AC termination of 600 ohms when paralleled with the residual load of the simulated inductance. The output of the attenuator is routed through the true RMS AC-to-DC convertor circuit 32 to a DC level measurement circuit 35 consisting of three op-amps 80 through 82 used as voltage comparators and a voltage reference circuit. The outputs of the op-amps indicate the level of the AC signal at the input of the attenuator. Analog transmission gates 76–79 are used to form LED mode control 34 to drive the LED 16 to its various displaced states.

The true RMS AC-to-DC convertor 32 may comprise a commercially available device identified as Analog Devices AD736. The DC level comparator of 35 may comprise commercially obtainable amplifier units 80 through 82 identified as LM614. The voltage reference circuit of 35 may comprise resistors 69 through 74 and a programmable voltage reference also contained in LM614 (commercially available). Resistors 69 through 74 may have ohmic values of 63.4, 2.26k, 4.22k, 2.74k, 31.6 and 105 respectively.

The LED mode control 34 may be comprised of four analog switches 76 through 79 available commercially as a unit designated 74HC4066.

The resistors 83 and 84 in series with diodes 85 and 86 respectively in the output of mode control 34 are current limiting means for LED 16.

The second AC test is a metallic noise measurement. The difference between this test and the loss test is that a C-MESSAGE filter and high-gain amplifier 31 replace the attenuator 64. The states of the LED are also different from the loss test in that lower noise is the better condition while high signal with the loss test is the favored signal. The analog transmission gates 76–79 of the LED mode control 34 are energized through switch 23 to control this state change.

Thus, in position two of switch 23 analog gates 77 and 79 are activated from line 87 for the loss test, while in positions three and four analog gates 76 and 78 are activated from line 88 for the noise tests of these positions.

The third AC test is a high-impedance C-MESSAGE noise measurement of power induced noise on the telephone line relative to earth ground. In this test, the AC signals across the telephone line are disconnected, and the input to the C-MESSAGE filter is connected through an attenuator of resistor 89 and capacitor 90 to an external ground lead 19. The pass-marginal-fail states of the LED are the same as with the metallic noise test.

A detailed discussion of the construction and operation of the C-MESSAGE filter and high-gain amplifier is believed unnecessary since such will be apparent to those skilled in the art from the schematic diagram of these circuits shown in FIG. 5. Suffice it to say that amplifiers 91 through 94 are a commercially-available unit designated as LM324. Amplifier 98 is one of the commercially-available units of amplifiers 95–97, the type previously identified.

The output of filter/amplifier 31 is coupled to the input of connector 32 through resistor 68.

The line tester of the present invention is completely powered from the telephone line to be tested. In use, the tester requires that the subscriber loop be capable of providing at least 20 milliamps of DC current at 8.6 volts at the customer interface or the point where the line is accessed. The serving central office battery voltage is not important as long as the minimum loop current requirement is met. Loss measurement requires a milliwatt generator in the serving office, and noise analysis requires a quiet termination in the office. Some central offices are equipped with tone generators that provide several seconds of milliwatt-signal followed by quiet. This will speed testing in that only one test call will be required. The switch sequence in the line tester is the same as this tone sequence. A craft telephone set is required to dial the test numbers and confirm answer back.

The line tester of the present invention may be operated according to the following step sequence:

1. Place the function switch 25 in the first (DIAL) position.
2. This position of the switch 25 connects the clip lead 17 (ring) and the clip lead 18 (tip) to clip terminal pads 20 and 21 respectively for dialing test numbers with a craft telephone set. This is the only selection that connects the clip terminal pads to the telephone line.
3. Connect test lead 17 to the RING terminal at the demarkation device. Connect the test lead 18 to TIP and the test lead 19 to local cable or protector ground.
4. Connect a craft telephone set tip and ring to the appropriate metal clip terminal pads 20 and 21 at the bottom of the test device. If the line is ground start and the craft telephone set is so equipped, use the telephone set in the manufacturer's prescribed manner to initiate dial tone.
5. Dial the serving central office test number for loss (milliwatt) with the craft telephone set.
6. When the test line answers, switch the function switch to "test". The telephone set will be disconnected. Test selector switch 23 is then used to select the test to be conducted.
7. In the first position of the switch 23 labeled "loop current," the tester qualifies the telephone line for loop current. If loop current is too low, the LED will glow red provided some loop current is present. If the current is marginal, the LED will glow yellow, and if the current is above marginal requirements, it will glow green.
8. In the second position of switch 23 labeled "LOSS", the tester is used to qualify the telephone line loss when used in conjunction with a milliwatt test signal provided by the serving central office. If the received signal is above −8.5 dBm then the LED will show green. An input below −10 dBm will show red. Between these levels the LED is yellow.
9. The third position of switch 23 is for qualifying circuit noise. The measurement is made according to IEEE standard 743-1984 with C-MESSAGE weighing true-RMS power. Noise levels above 30 dBrnC will result in a red display. Noise between 20 and 30 DbrnC will result in yellow and below 20 dBrnC will result in green. The telephone line being tested must be connected to a silent termination number in the serving central office for the test.
10. The fourth position is for power influence or longitudinal noise measurement and requires the use of the ground test lead 19. This measurement also requires silent termination in the serving central offices. A level above 90 dBrnC will result in a red LED display. Between 80 and 90 dBrnC will result in a yellow LED display. Below 80 dBrnC will result in a green LED display.
11. If quiet termination requires a different test number from milliwatt, then move the function switch 25 to DIAL, go on hook with the telephone set and dial the quiet termination test number. When the line is answered, move the selector switch two places to NOISE.

If the central office tone generator is the type that automatically switches to quiet termination after a certain time period, then at that time, the LED will turn red. Move the selector switch to the next position for metallic noise.

If the LED stays red, then this is a circuit noise failure (greater than 30 dBrnC). Yellow will indicate marginal (greater than 20 dBrnC) and green will indicate pass (less than 20 dBrnC).

12. After observing the circuit noise result, move the selector switch to the last position (POWER INFLUENCE). The LED will glow red for failure (greater than 90 dBrnC), yellow for marginal (greater than 80 dBrnC), and green for pass (less than 80 dBrnC). This measurement requires that the green ground lead be connected.

Thus, there has been disclosed a hand-held, line-powered telephone line tester capable of selectively, automatically conducting four different telephone line loop qualifying tests including loop current, loss, circuit noise and power influence noise. Provision is made for use of a craft telephone that may be clipped to externally accessible clip pads on the tester. The tester is connected to the telephone line for tests using three clip leads for "ring", "tip" and "external ground" connections. Test results are indicated by three color LED that will display green for acceptable, yellow for marginal and red for fail for each of the tests.

The line tester of the present invention has been described above in a preferred embodiment, but the invention is not intended to be restricted in its scope thereto. For example, the switching means 23 and 25 need not be mechanical but could instead be electronic. Although the external connections to the tester had been described as "clip leads" 17, 18 and 19 and "clip terminal pads" 20 and 21, other connection means are suitable, such as, for example, modular or other types of plugs and sockets. Further, the exact circuitry of the various test sections as shown in the detailed schematic diagram or as embodied in specific integrated circuit devices are not critical so long as the overall function of the circuits as described in connection with the various means as diagramed in FIG. 2 is present.

Thus, the above-described invention is to be limited only as set forth in the following claims.

What is claimed is:

1. A telephone line testing device comprising:
   a. a first connection means for connecting said testing device to "ring", "tip" and external ground lines of the telephone line to be tested;
   b. a second connection means for making "ring" and "tip" connections to a craft telephone;
   c. first testing means connectable to receive DC signals from said "ring" and said "tip" lines through said first connection means and to provide electrical signals indicative of the magnitude of direct current available from said lines;
   d. second testing means connectable to receive AC signals from said "ring" and said "tip" lines through said first connection means, said AC signals having resulted from signals of a known magnitude being applied to said lines, and to provide electrical signals indicative of the signal loss on said lines;

e. third testing means connectable to receive AC signals through said first connection means selectably either from said "tip" and said "ring" connections or from said "tip" and said external ground connections comprising filter and amplifier means to receive and treat said AC signals and to apply said treated signals to the input of said second testing means; and f. a line holding and power supply means connectable to draw a line holding current from said "ring" and said "tip" lines through said first connection means and to produce regulated direct current to power said second and third testing means.

2. The telephone line testing device of claim 1 further comprising first and second switching means, said first switching means being operable to selectably connect said "ring" and said "tip" lines either to said second connection means or to said second switching means, said second switching means operable to selectably connect said "ring" and said "tip" lines either to said first testing means or to said second testing means or to said third testing means or to connect said external ground line and said "ring" line to said third testing means.

3. The telephone line testing device of claim 1 further comprising test result display means providing indication of "pass", "marginal" or "fail" for each test conducted.

4. The telephone line testing device of claim 3 wherein said result display means comprises a three-color, light-emitting diode.

5. The telephone line testing device of claim 2 further comprising test result display means providing indication of "pass", "marginal" or "fail" for each test conducted.

6. The telephone line testing device of claim 2 wherein said second switching means comprises a four-pole, four-position switch.

7. The telephone line testing device of claim 6 wherein said four-pole switch is a "make-before-break" switch.

8. The telephone line testing device of claim 6 further comprising test result display means providing indication of "pass", "marginal" or "fail" for each test conducted.

9. The telephone line switching device of claim 8 where in said result display means comprises a three-color, light-emitting diode.

10. The telephone line testing device of claim 6 wherein a first position of said second switching means provides connection of said first test means to said DC signals, the second position of said second switching means provided connection of said second testing means to receive AC signals on said telephone line indicative of line loss and to said test result display means, the third position of said second switching means provided connection of said third testing means to receive AC signals on said telephone line indicative of circuit noise and to connect the output of said second testing means to said test result display means, and the fourth position of said second switching means provided connection of said third test means to receive AC signals on said telephone lines indicative of influence noise and connects the output of said second testing means to said test result means.

11. The telephone line testing device as defined in claim 10 wherein said second, third and fourth positions of said second switching means disconnect said first testing means rom signal input, and said first and second positions provide connection the inputs of said third testing means to circuit ground.

12. A telephone line testing device comprising: testing circuits for quantifying noise present on telephone lines under test and a line holding and power supply means receiving DC power from said telephone lines under test and providing therefrom regulated DC power for operation of said testing circuits.

13. The testing device of claim 12 wherein said power supply means comprises an artificial inductor element formed of a self-biased transistor element having its emitter-collector circuit series connected in an output line and a zener diode connected between two output lines of said power supply.

14. A line holding and power supply for use in a telephone line tester comprising an artificial inductor of a self-biased transistor element having its emitter-collector circuit and a low-value emitterresistor in series connection between an input terminal and an output terminal of said power supply and a zener diode connected in shunt across the output terminals of said power supply.

15. The line holding and power supply of claim 14 further comprising a bias resistance connected between the collector and the base terminals of said transistor element, a capacitance connected between the emitter and the base terminals of said transistor element and a filter capacitor connected across the terminals of said zener diode.

16. A method of testing a telephone line comprising the steps of:
a. establishing individual electrical connections between switching elements of a telephone line tester and the "ring", "tip" and "external ground" conductors of the telephone line to be tested;
b. connecting a "ring" and "tip" conductors of a craft telephone through said switching elements to the "ring" and "tip" conductors, respectively, of said telephone line;
c. operating said craft telephone to cause central office equipment to supply said telephone line with appropriate power signal and termination connections for conducting line current, loss and noise tests;
d. operating said switching elements of said tester to interrupt the connection between said conductors of the craft telephone and the conductors of said telephone line and to establish connection of said "ring" and "tip" conductors of said telephone line to a loop current test circuit of said line tester; and
e. thereafter operating said switching elements to interrupt said connections between said loop current test section and to establish connection of said "ring" and "tip" conductors of said telephone line to a "loss" testing section of said tester.

17. The method of claim 16 comprising the further step of operating said switching elements to interrupt connections to said loss test section and to establish connections between said "ring" and "tip" conductors of said telephone line and a "line noise" test section of said tester.

18. The method of claim 16 comprising the further step of operating said switching elements to interrupt said connections to said loss test section and to establish connection between said "ring", "tip" and "external ground" conductors of said telephone line to an influence noise test circuit of said tester.

19. The method of claim 17 comprising the further step of operating said switching elements to interrupt connections of said "ring" and "tip" conductors to said "line noise" test section and to establish a connection between said "ring", "tip" and "external ground" conductors of said telephone line to an influence noise test section of said tester.

20. The method of claim 18 comprising the further step of operating said switching elements to interrupt connections between said "ring", "tip" and "external ground" conductors and said influence noise testing section of said tester and to establish "ring" and "tip" conductors of said telephone line to a "line noise" test section of said tester.

* * * * *

UNITED STATES PATENT AND TRADEMARK OFFICE
CERTIFICATE OF CORRECTION

PATENT NO. : 5,218,616
DATED : June 8, 1993
INVENTOR(S) : Charles D. Stephens

It is certified that error appears in the above-indentified patent and that said Letters Patent is hereby corrected as shown below:

Columns 9 & 10:

Claim 10, line 5, cancel "provided" and in lieu thereof insert -- provides --.

Claim 10, line 9, cancel "provided" and in lieu thereof insert -- provides --.

Claim 10, lines 13 and 14, cancel "provided" and in lieu thereof insert -- provides --.

Claim 11, line 4, cancel "rom" and in lieu thereof insert -- from --.

Claim 14, cancel "emitterresistor" and in lieu thereof insert -- emitter-resistor --.

Signed and Sealed this

Eighth Day of February, 1994

Attest:

BRUCE LEHMAN

Attesting Officer     Commissioner of Patents and Trademarks